US012648524B1

(12) United States Patent
Goddard et al.

(10) Patent No.: US 12,648,524 B1
(45) Date of Patent: Jun. 9, 2026

(54) BALE SLICER BUCKET, MOUNTING METHOD, AND ASSEMBLY

(71) Applicant: RUSSELL CREEK ENGINEERING, LLC, Chetopa, KS (US)

(72) Inventors: Christopher D. Goddard, Welch, OK (US); Fred S. Goddard, Jr., Welch, OK (US)

(73) Assignee: RUSSELL CREEK ENGINEERING, LLC, Chetopa, KS (US)

( * ) Notice: Subject to any disclaimer, the term of this patent is extended or adjusted under 35 U.S.C. 154(b) by 0 days.

(21) Appl. No.: 19/070,737

(22) Filed: Mar. 5, 2025

(51) Int. Cl.
| | |
|---|---|
| *A01F 29/09* | (2010.01) |
| *A01F 29/01* | (2006.01) |
| *A01F 29/08* | (2006.01) |
| *B65B 69/00* | (2006.01) |

(52) U.S. Cl.
CPC .............. *A01F 29/09* (2013.01); *A01F 29/01* (2013.01); *A01F 29/08* (2013.01); *B65B 69/0025* (2013.01)

(58) Field of Classification Search
CPC ..... E02F 3/3618; E02F 3/3627; E02F 3/3631; E02F 3/3609; A01F 29/005; A01F 29/01; A01F 29/09; B65B 69/0025
USPC ....................................................... 241/605
See application file for complete search history.

(56) References Cited

U.S. PATENT DOCUMENTS

| | | | | | |
|---|---|---|---|---|---|
| 3,115,261 A | * | 12/1963 | Antolini | ................... | E02F 3/962 |
| | | | | | 37/405 |
| 3,760,883 A | * | 9/1973 | Birk | ..................... | A01B 59/062 |
| | | | | | 37/231 |

| | | | | | |
|---|---|---|---|---|---|
| 3,845,871 A | * | 11/1974 | DiLillo | ................. | E02F 3/3636 |
| | | | | | 414/723 |
| 4,116,347 A | * | 9/1978 | Uchida | ................. | E02F 3/3663 |
| | | | | | 414/723 |
| 4,545,721 A | * | 10/1985 | Pettersson | ............... | E02F 3/401 |
| | | | | | 414/607 |
| 6,168,369 B1 | * | 1/2001 | Bright | .................. | E02F 3/3604 |
| | | | | | 37/405 |
| 8,528,843 B2 | * | 9/2013 | Murphy | ............... | A01D 87/127 |
| | | | | | 414/412 |
| 2007/0245603 A1 | * | 10/2007 | Vering | ................. | E02F 3/3663 |
| | | | | | 37/468 |

(Continued)

FOREIGN PATENT DOCUMENTS

| | | | | | |
|---|---|---|---|---|---|
| GB | 2483988 A | * | 3/2012 | .......... | A01F 29/005 |
| JP | 2003193445 A | * | 7/2003 | | |

(Continued)

OTHER PUBLICATIONS

Keltec Bale Slicer—https://keltec.ie/product/test/#.
Keltec Bale Slice and Bucket filling mixer wagons—video—https://www.youtube.com/watch?v=ZOQwKVBkkTw.

*Primary Examiner* — Joshua G Kotis
(74) *Attorney, Agent, or Firm* — Dennis D. Brown; Brown Patent Law, P.L.L.C.

(57) ABSTRACT

A loader bucket for mounting in a bale slicer apparatus, and a method of quickly and securely mounting the loader bucket in the bale slicer apparatus to form a loading assembly without having to first remove the bale slicer apparatus from the slicer carrier vehicle. After using the loading assembly, e.g., to scoop, carry, and dump loose feed and feed supplement materials, the loader bucket can be conveniently removed from bale slicer apparatus to resume using the bale slicer apparatus for lifting, carrying, and opening bales of feed material.

10 Claims, 10 Drawing Sheets

(56) References Cited

U.S. PATENT DOCUMENTS

| | | | | |
|---|---|---|---|---|
| 2008/0041989 | A1* | 2/2008 | Schierman | A01D 87/127 241/101.72 |
| 2011/0217153 | A1* | 9/2011 | Lanting | E02F 3/96 414/723 |
| 2013/0149082 | A1* | 6/2013 | Sheedy | A01F 29/005 414/412 |
| 2014/0173947 | A1* | 6/2014 | Stewart | E02F 3/962 37/444 |
| 2014/0178165 | A1* | 6/2014 | Stewart | B66C 1/68 414/724 |
| 2017/0328026 | A1* | 11/2017 | Martin | E02F 3/3663 |
| 2019/0350134 | A1* | 11/2019 | Guiet | E02F 3/413 |

FOREIGN PATENT DOCUMENTS

| | | | | |
|---|---|---|---|---|
| WO | WO-0040072 | A2 * | 7/2000 | A01D 87/0076 |
| WO | WO-2014068019 | A1 * | 5/2014 | A01D 87/127 |

* cited by examiner

BALE SLICER BUCKET, MOUNTING METHOD, AND ASSEMBLY

FIELD OF THE INVENTION

The present invention relates to buckets which can be removably mounted in bale slicing apparatuses, and to methods of mounting and using such buckets for scooping, carrying, and dumping loose feed materials, feed supplement materials, and/or other commodities for livestock feeding and feed mixing operations, and for other purposes.

BACKGROUND OF THE INVENTION

Round bales containing silage or other fodder for livestock feeding operations are commonly wrapped in plastic covering materials which (i) hold the feed material for storage and transport and (ii) can also prevent air from reaching the baled material to promote fermentation. In addition, hay and other livestock feed materials are also commonly stored in the form of round bales which are bound by plastic meshing, net wraps, string, twine, etc.

For feeding livestock and/or dumping the feed material into a feed mixer, the round bales of feed material are commonly lifted, carried, and opened using a mechanical bale slicer apparatus which is carried on the end a boom. The boom will typically comprise two or more arms which extend from a tractor, a skid steer, or similar carrier vehicle. One example of a commercially available bale slicer apparatus of this type is the BALE SLICE apparatus manufactured by Keltec Engineering.

By way of example, a bale slicer apparatus 2 of the type commonly used in the art is illustrated in FIGS. 1-5. The bale slicer apparatus 2 comprises: (i) a curved frame 4 which is pivotally installed on the ends of the boom arms 5 of a carrier vehicle for up and down hydraulic pivoting movement; (ii) a cutting jaw 6 which is pivotally mounted in the curved frame 4 for hydraulic pivoting movement from a fully open lower position of the cutting jaw 6 to a fully closed upper position; and (iii) a plurality of tines 8 which project forwardly from the bottom of the curved frame 4 and can be used for lifting and for other purposes.

The cutting jaw 6 comprises: (a) a pair of parallel outer side arms 10 and 12 having rearward ends which are pivotally connected to the curved outer members 14 and 16 of the frame 4 of the slicer apparatus 2; (b) a serrated knife blade 18 which extends transversely between the distal, forward ends of the parallel outer arms 10 and 12 of the cutting jaw 6; (c) a rearward cross-support 20 of the cutting jaw 6 which extends transversely between the outer arms 10 and 12 of the cutting jaw 6 at a rearward location close to the curved outer frame members 14 and 16; and (d) one or more, preferably two, hydraulic cylinders 21 and 23 connected between the cutting jaw 6 and the curved frame 4 for pivoting the cutting jaw 6 upwardly and downwardly with respect to the frame 4.

Because the rearward cross-support 20 and the knife blade 18 of the cutting jaw 6 are each located forwardly of the rearward pivot point of the cutting jaw 6, the rearward cross-support 20 and the knife blade 18 of the cutting jaw 6 will each travel in an arc with respect to the curved frame 4 when the cutting jaw 6 is pivoted upwardly and downwardly within the concave forward face 25 of the frame 4. For purposes of the present invention as described below, although it will be understood that square or other shapes can alternatively be used, the rearward cross-support 20 of the cutting jaw 6 will preferably be cylindrical.

As illustrated in FIG. 3, when using the bale slicer apparatus 2 to lift, carry, and open a round bale 22 of silage or other livestock feed, the cutting jaw 6 will first be pivoted downwardly to its fully open position. Then, the curved frame 4 will be pivoted downwardly and lowered so that the round bale 22 is received within the bale slicer apparatus 2 between the open cutting jaw 6 and the curved frame 4.

Next, as illustrated in FIG. 4, the cutting jaw 6 will be pivoted a short distance toward the closed position of the cutting jaw 6 whereby the knife blade 18 of the cutting jaw 6 engages (bites) the round bale 22 to a degree which is sufficient for the cutting jaw 6 to hold the bale 22 in the bale slicer apparatus 2. This allows the bale slicer apparatus 2 to lift and carry the bale 22 to the desired feeding or mixing location. Then, at the desired release site for feeding or mixing, the cutting jaw 6 will be pivoted upwardly to its closed position as illustrated in FIG. 5 such that the knife blade 18 cuts upwardly through the covering 24 (or other binder) of the bale 22 to allow the silage or other feed 26 to fall out of the covering 24. However, the covering 24 will be retained by the bale slicer apparatus 2 by the engagement of the serrated knife blade 18 of the cutting jaw 6 with a receiver 28 at the top of the curved frame 4.

When conducting feed mixing and other operations, it is often the case that the vehicle used for carrying and operating the bale slicer apparatus 2 must also be used for other purposes. In particular, it is often necessary that the vehicle must also be used as a front end loader for scooping and carrying loose feed materials, feed supplement materials, and/or other commodities or materials and dumping these materials into a mixing apparatus for blending with the baled feed material.

However, the need to also use the carrying vehicle as a front end loader requires that the bale slicer apparatus 2 must be frequently and repeatedly disconnected and reconnected to the vehicle for intermittently connecting a loader bucket. In addition to being inconvenient and time consuming, the need to repeatedly disconnect and reconnect the bale slicer apparatus 2 produces a great deal of wear and tear on the slicer apparatus 2 and on the carrying vehicle, and on the hydraulic linkages between the two.

To address this problem, an attempt was previously made to develop a loader bucket which could be connected to and carried by a bale slicer apparatus so that the loader bucket could be used by the carrying vehicle without having to first disconnect the bale slicer. The prior bucket was carried on top of the tines projecting from the bottom of the curved slicer frame and included a pair of upwardly oriented clips which extended rearwardly from the top of the bucket for clipping under a horizontal, rectangular frame member of the slicer apparatus. To remove the prior bucket from the bale slicer, it was necessary to use the cutting jaw of the bale slicer to apply a significant amount of downward force to the top of the bucket to pop the attachment clips loose.

Unfortunately, the clipping system of the prior bucket was not able to adequately secure the bucket in the bale slicer apparatus for lifting and pivoting. Consequently, the bucket would often fall out of bale slicer apparatus onto the ground or into the feed mixing apparatus. Moreover, the use of the cutting jaw to pop the attachment clips of the prior bucket placed significant stress on the cutting jaw, the frame, and the hydraulic cylinders of the bale slicer apparatus, and caused the prior bucket to jump out of the bale slicer when disconnected.

Consequently, a need exist for a loader bucket apparatus and method for a bale slicer wherein: (i) the loader bucket can be conveniently and easily installed in and removed from the bale slicer apparatus so that the loader bucket can be used without having to remove the bale slicer apparatus from the carrier vehicle; (ii) the loader bucket will be securely held in the bale slicer apparatus so that the loader bucket will not fall out of the slicer apparatus onto the ground or into a feed mixing apparatus; and (iii) the installation, use, and removal of the loader bucket will not produce stress forces which are harmful for the cutting jaw, the frame, the hydraulics, or other components of the bale slicer apparatus.

SUMMARY OF THE INVENTION

The present invention alleviates the problems and satisfies the needs discussed above. The invention provides (i) a novel loader bucket, (ii) a method of mounting the loader bucket in a bale slicer apparatus installed on a carrier vehicle, and (iii) a loading assembly formed by the inventive mounting method. The loader bucket is conveniently and easily installed in and removed from the bale slicer apparatus so that the loader bucket can be used without having to remove the bale slicer apparatus from the carrier vehicle. In addition, the loader bucket is securely held in the bale slicer apparatus so that the loader bucket will not fall out of the slicer apparatus onto the ground or into a feed mixing apparatus. Moreover, the manner in which the loader bucket is mounted and disconnected does not produce stress forces which are harmful for the cutting jaw, the frame, the hydraulics, or other components of the bale slicer apparatus.

In one aspect, there is provided a bucket which is mountable in a bale slicer apparatus. The bucket preferably comprises: (a) a floor having a laterally extending scooping edge at the forward longitudinal end of the floor; (b) a left side wall extending upwardly from the left lateral end of the floor; (c) a right side wall extending upwardly from the right lateral end of the floor; (d) a lateral back wall which extends upwardly from the rearward longitudinal end of the floor; and (e) two or more rear attachment hook structures which are spaced laterally apart. Each of the rear attachment hook structures preferably has (i) a proximal end which is attached on or above an upper portion of the lateral back wall, (ii) a downwardly curved hook on a distal end of the rear attachment hook structure, and (iii) an arm which extends rearwardly, at an upward inclination, between the proximal end of the rear attachment hook structure and the downwardly curved hook on the distal end of the rear attachment hook structure.

In another aspect, there is provided a loading assembly which comprises a bale slicer apparatus having a bucket mounted therein. The bale slicer apparatus preferably comprises: a curved frame having a concave forward face; a cutting jaw; and a plurality of tines which project forwardly from the bottom of the curved frame. The cutting jaw of the bale slicer preferably comprises: (i) an opposing pair of outer side arms which have distal ends and have rearward ends which are pivotably connected to the curved frame; (ii) a knife blade which extends transversely between the distal ends of the outer side arms; and (iii) a rearward cross-support which extends transversely between the outer side arms and moves in an arc within the forward face of the curved frame when the cutting jaw is pivoted upwardly and downwardly with respect to the curved frame.

The bucket of the loading assembly preferably comprises: a floor; a back wall which extends upwardly from the floor; a pair of rear attachment hook structures which are laterally spaced apart; and two or more tine sleeves which extend longitudinally on an exterior bottom of the floor of the bucket and in which a corresponding number of the tines of the bale slicer apparatus are received. Each of the rear attachment hook structures of the bucket preferably comprises: (i) a proximal end which is attached on or above an upper portion of the back wall of the bucket; (ii) a downwardly curved hook on a distal end of the rear attachment hook structure; and (iii) an arm which extends rearwardly, at an upward inclination, between the proximal end of the rear attachment hook structure and the downwardly curved hook on the distal end of the rear attachment hook structure. The rearward cross-support of the cutting jaw is upwardly received in the downwardly curved hooks on the distal ends of the rear attachment hook structures of the bucket to hold the bucket in the bale slicer apparatus.

In another aspect, there is provided a method of mounting a loader bucket in a bale slicer apparatus. The method preferably comprises the initial steps of: (a) placing the loader bucket on a ground, pavement, or floor surface and (b) aligning the bale slicer apparatus behind the loader bucket.

The loader bucket used in the method preferably comprises: (i) a floor with an exterior bottom; (ii) a left attachment hook structure which extends rearwardly from the loader bucket at an upward inclination and has a downwardly curved hook on a distal end thereof, (iii) a right attachment hook structure which extends rearwardly from the loader bucket at an upward inclination, has a downwardly curved hook on a distal end thereof, and is laterally spaced apart from the left attachment hook structure; and (iv) two or more tine sleeves which extend longitudinally forward on the exterior bottom of the floor of the loader bucket and have rearward openings.

The bale slicer apparatus used in the method preferably comprises: a curved frame having a concave forward face; a cutting jaw; and a plurality of tines which project forwardly from a bottom of the curved frame. The cutting jaw of the bale slicer preferably comprises: (i) an opposing pair of left and right outer side arms which have forward distal ends and have rearward ends which are pivotably connected to the curved frame; (ii) a knife blade which extends transversely between the distal ends of the left and right outer side arms; and (iii) a rearward cross-support which extends transversely between the left and right outer side arms and moves in an arc within the forward face of the curved frame when the cutting jaw is pivoted upwardly and downwardly with respect to the curved frame.

Following steps (a) and (b), the method preferably further comprises the steps of (c) pivoting the cutting jaw to an upward position in which the knife blade of the cutting jaw is at an elevation higher than and will pass over the left and right rear attachment hook structures of the loader bucket; (d) moving the bale slicer forwardly toward the loader bucket so that the knife blade of the cutting jaw passes over the left and right rear attachment hook structures and one of the tines of the bale slicer apparatus is received in the rearward opening of each one of the tine sleeves of the loader bucket; (e) pivoting the cutting jaw downwardly so that the left and right rear attachment hook structures are received in the cutting jaw between the left and right outer side arms of the cutting jaw and between the knife blade and the rearward cross-support of the cutting jaw; (f) moving the bale slicer apparatus further forward so that the rearward cross-support of the cutting jaw is positioned beneath the downwardly curved hooks on the distal ends of the left and right rear attachment hook structures; and (g) pivoting the cutting jaw and the rearward cross-support thereof upwardly so that the rearward cross-support of the cutting jaw is received in the downwardly curved hooks on the distal ends of the left and right rear attachment hook structures and holds the loader bucket in the bale slicer apparatus.

Further aspects, features, and advantages of the present invention will be apparent to those in the art upon reviewing the accompanying drawings and upon reading the following Detailed Description of the Preferred Embodiments.

DETAILED DESCRIPTION OF THE PREFERRED EMBODIMENTS

Figure 1:
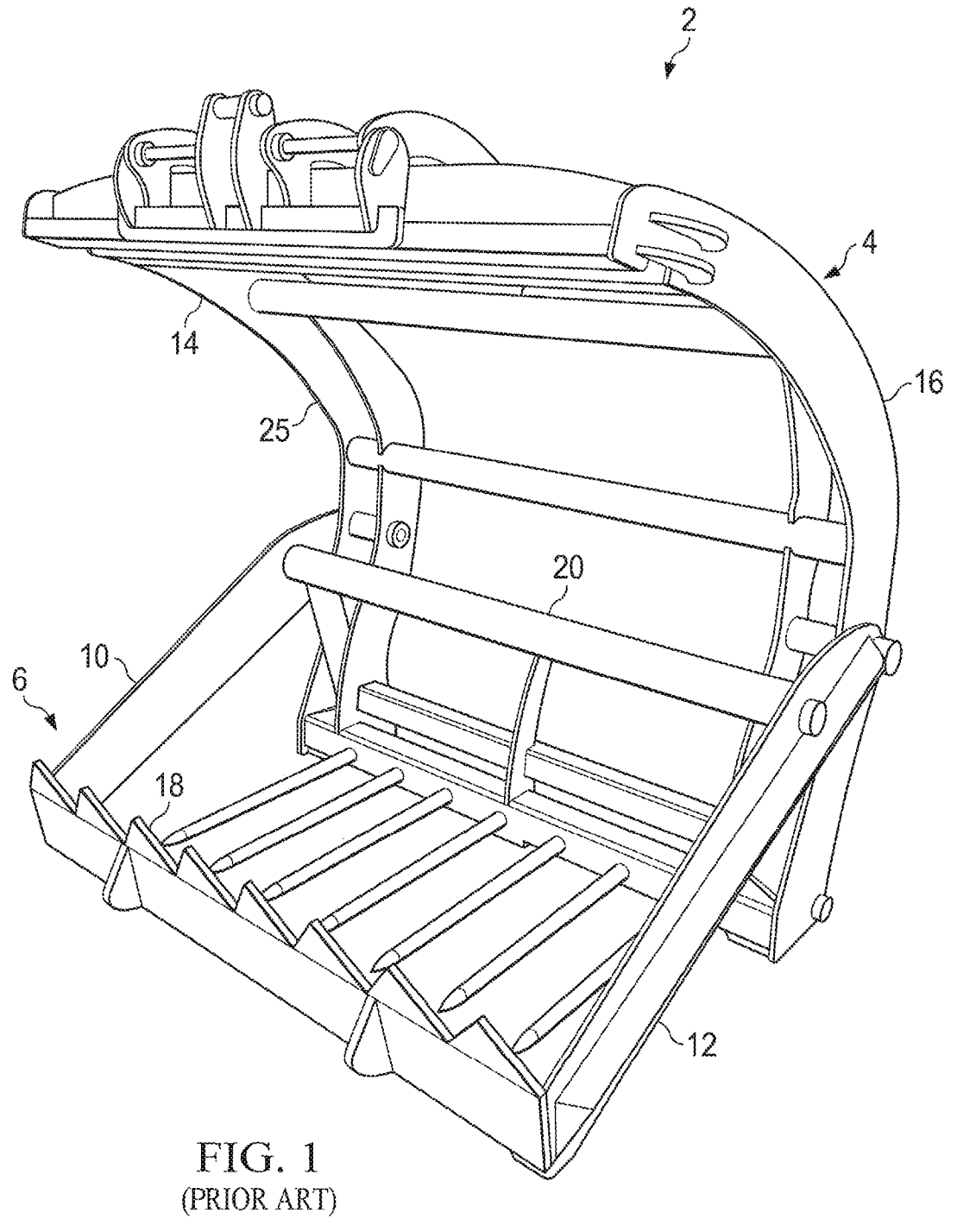
FIG. 1 is a perspective view of an embodiment 2 of a prior art bale slicer apparatus which can be used in the method of the present invention to form an inventive loading assembly 85.
Figure 2:
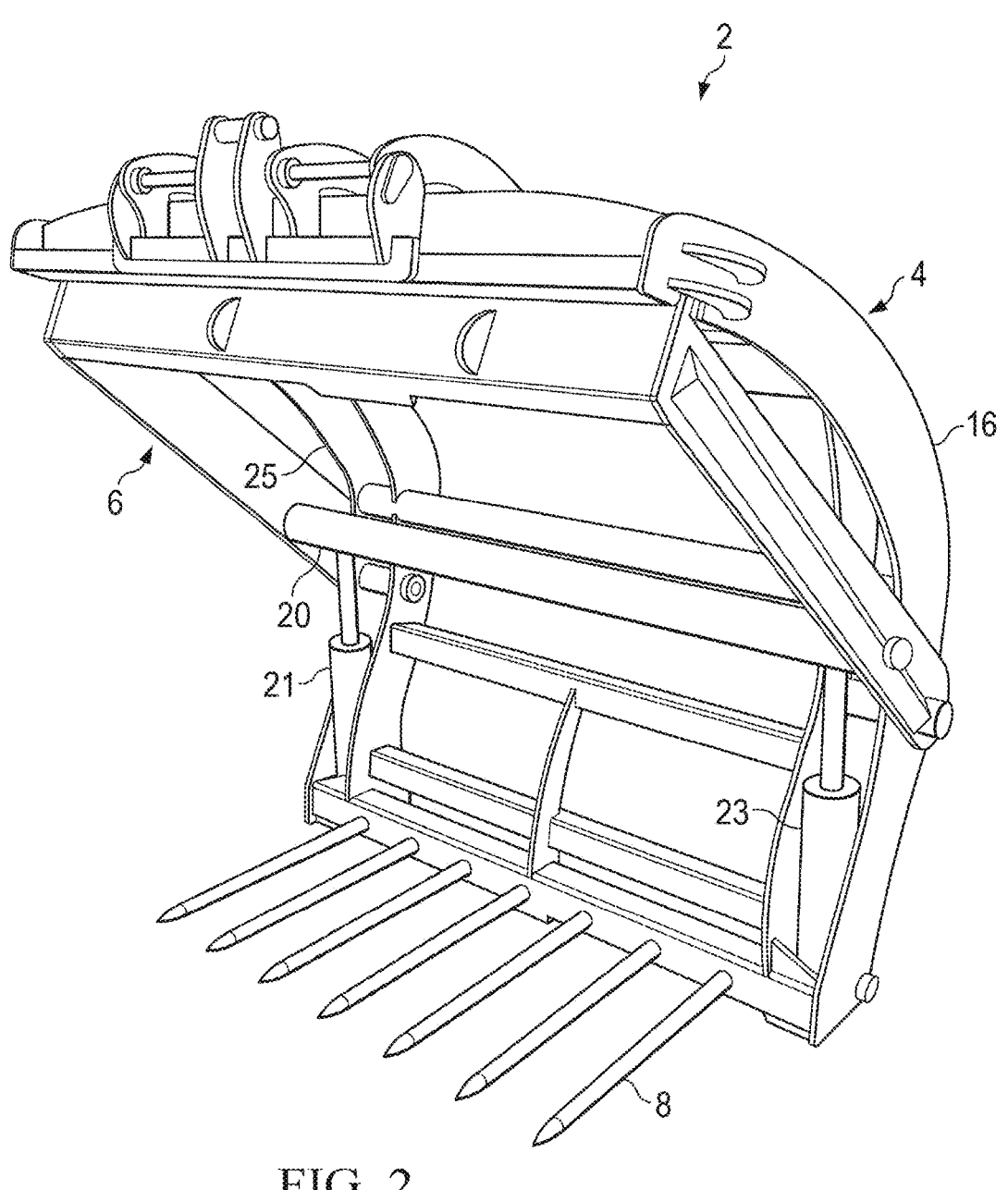
FIG. 2 is another perspective view of the prior art bale slicer apparatus 2.
Figure 3:
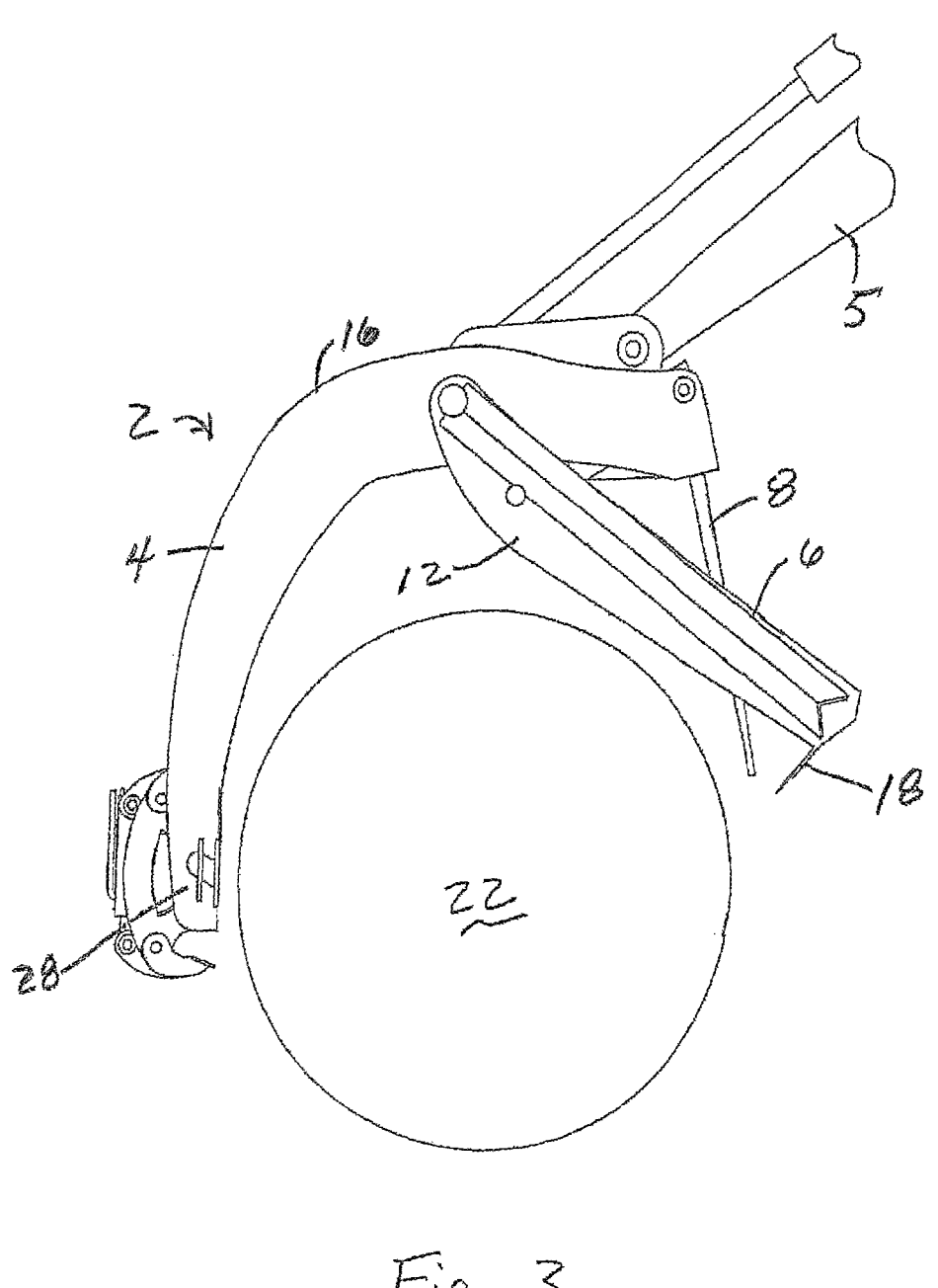
FIG. 3 illustrates the prior art bale slicer apparatus 2 being positioned for grabbing a round bale 22 of feed material.
Figure 4:
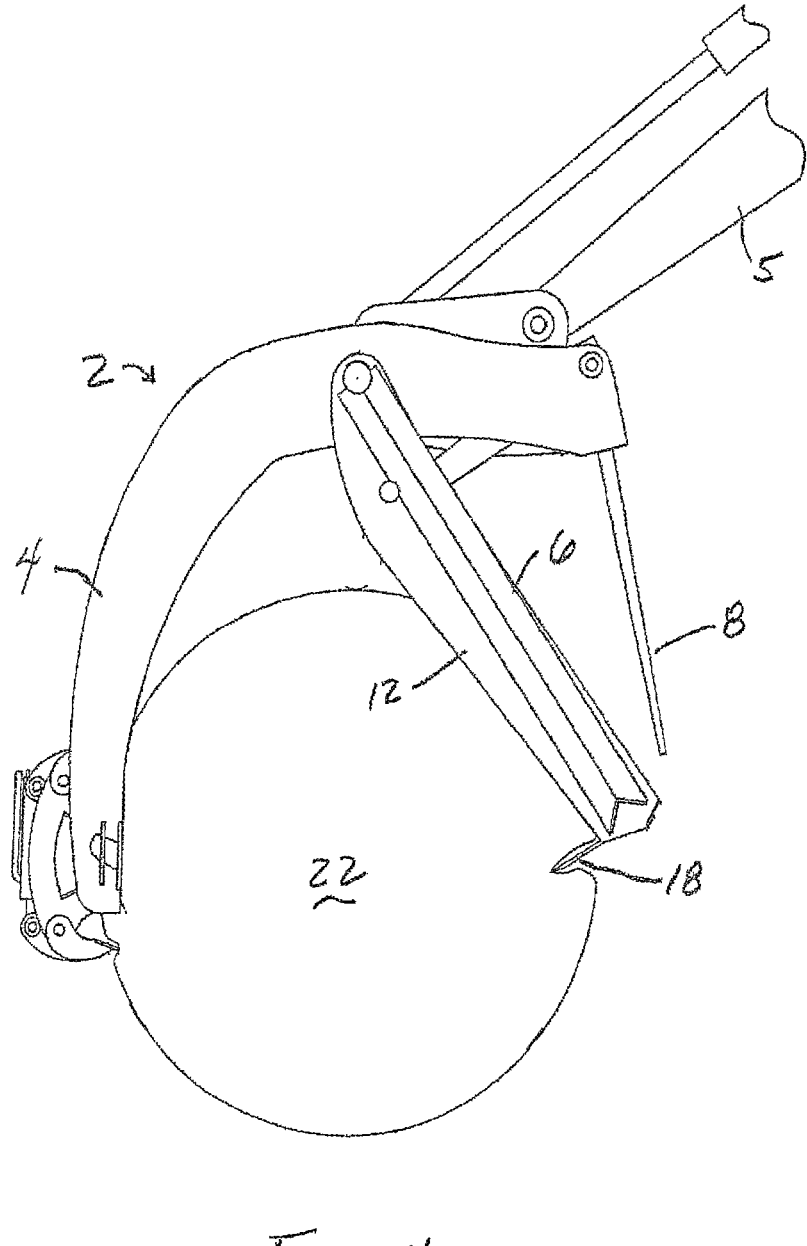
FIG. 4 illustrates the prior art bale slicer apparatus 2 grabbing the round bale 22 of feed material.
Figure 5:
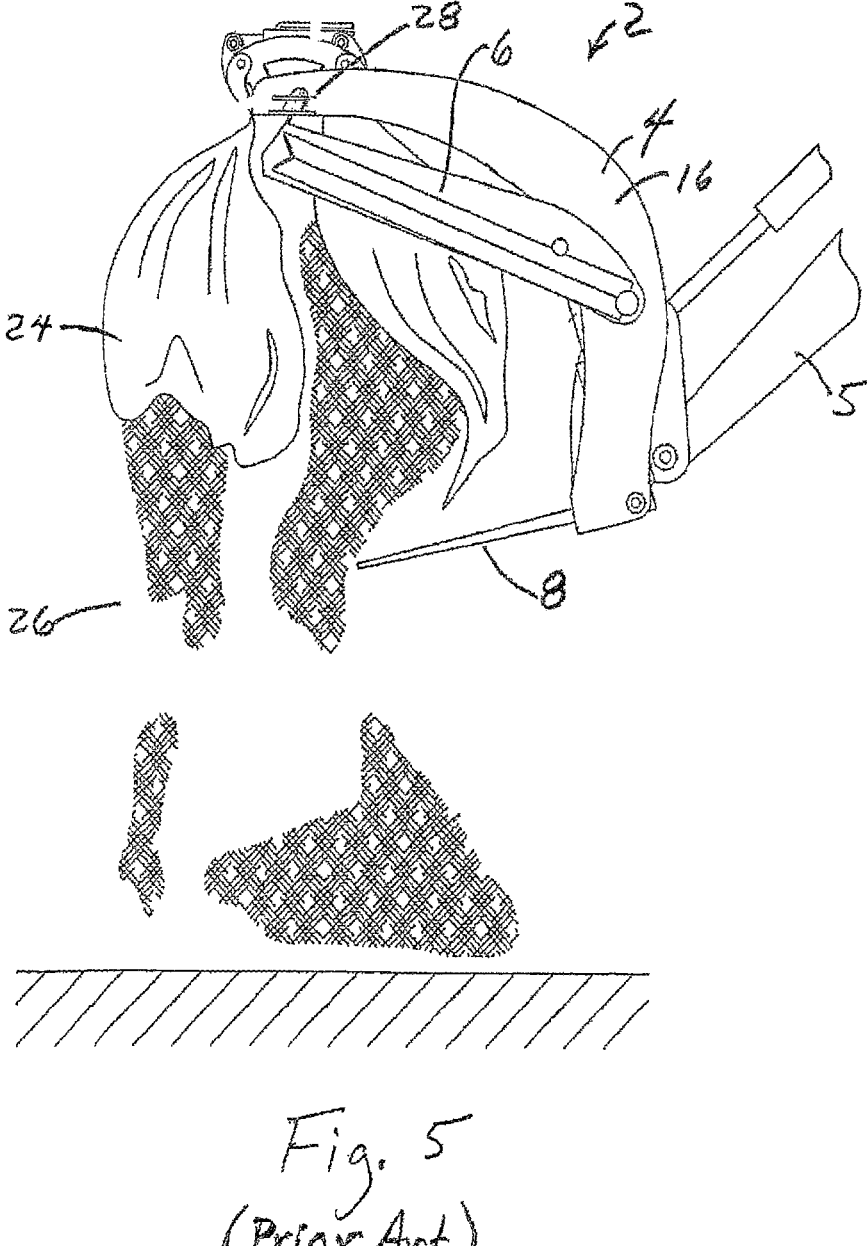
FIG. 5 illustrates the prior art bale slicer apparatus 2 slicing and emptying the round bale 22 of feed material.
Figure 6:
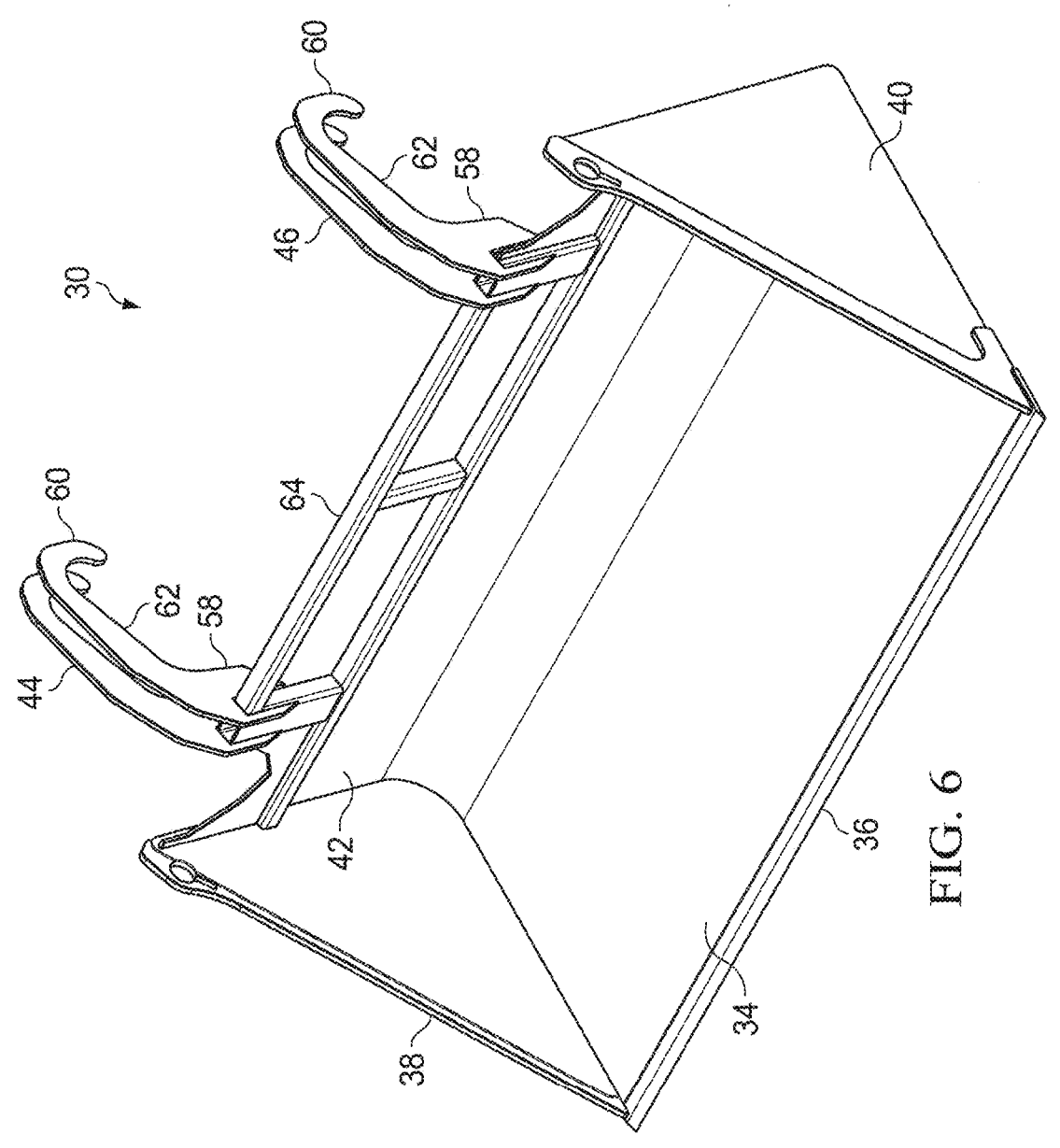
FIG. 6 is a perspective view of an embodiment 30 of the loader bucket provided by the present invention.
Figure 7:
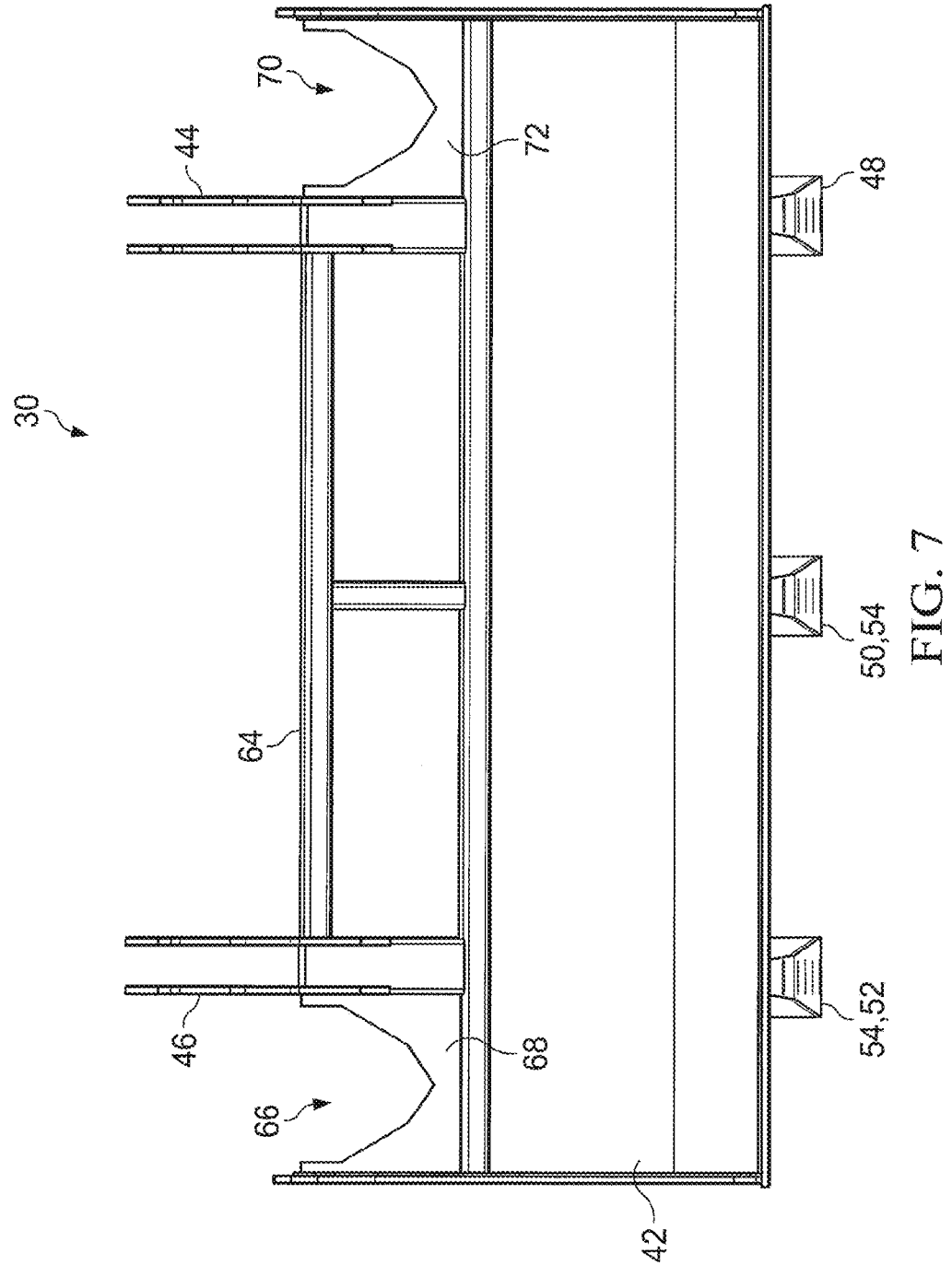
FIG. 7 is an elevational back view of the inventive loader bucket 30.
Figure 8:
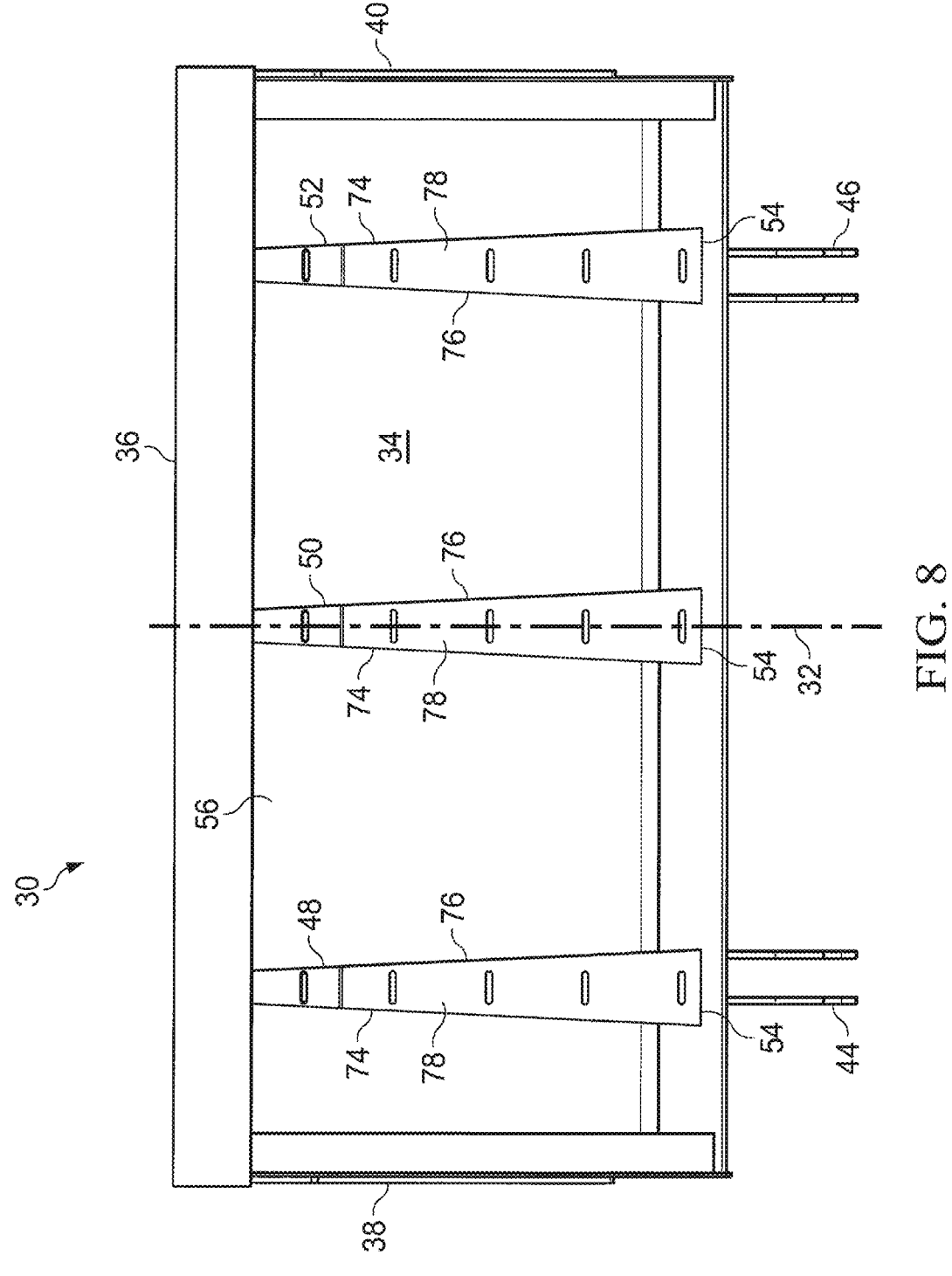
FIG. 8 is a bottom view of the inventive loader bucket 30.
Figure 9:
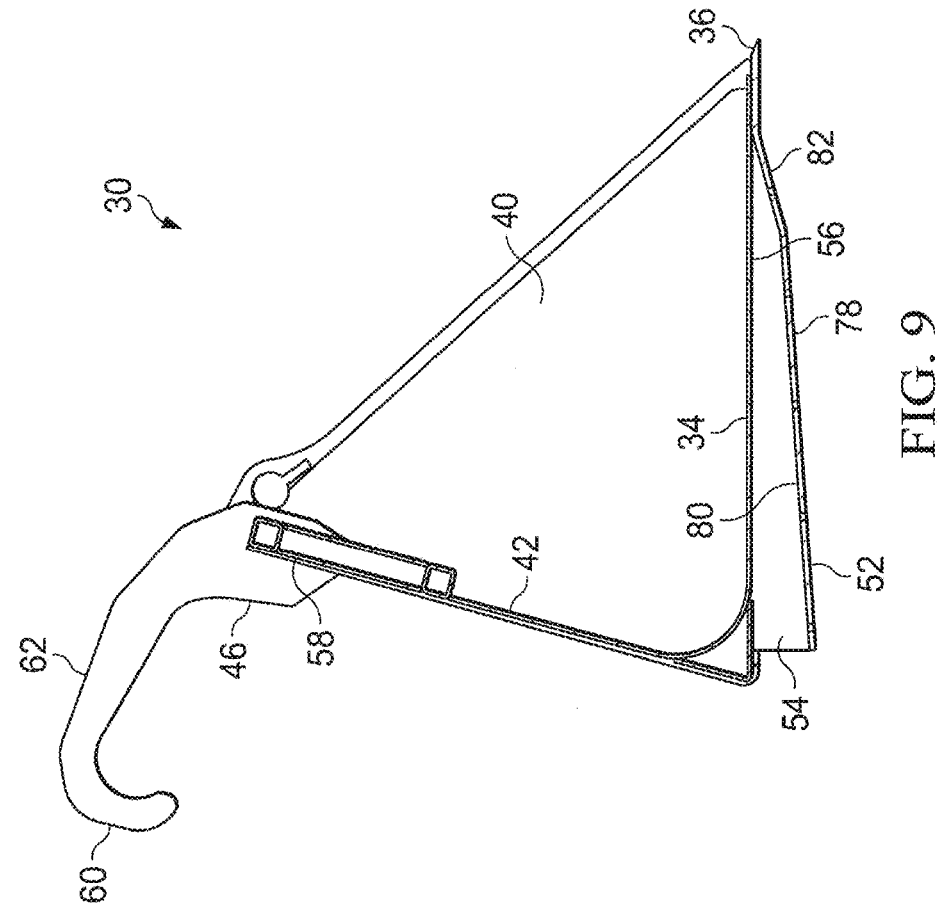
FIG. 9 is an elevational side view of the inventive loader bucket 30.
Figure 10:
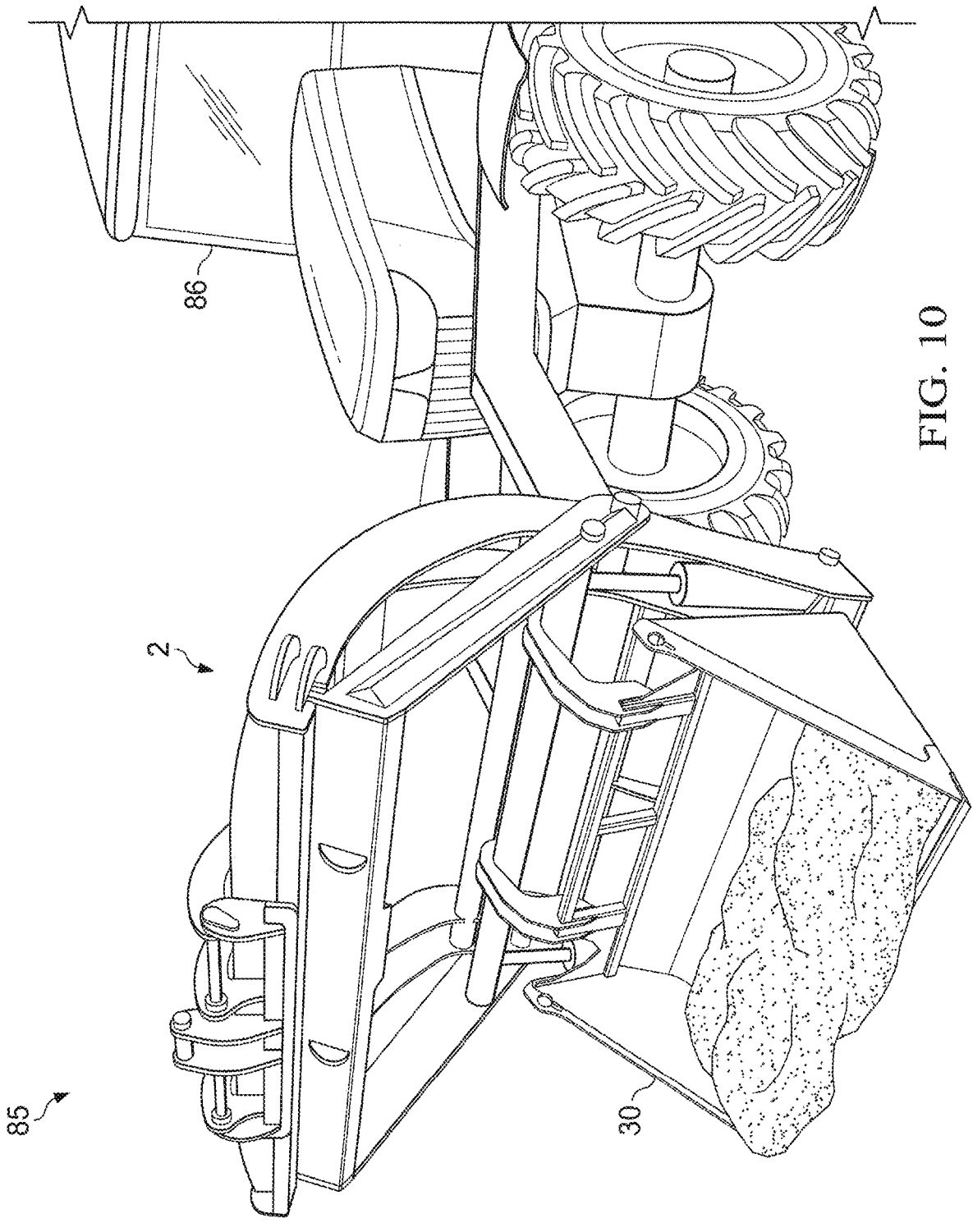
FIG. 10 is a perspective view of an embodiment 85 of the loading assembly of the present invention formed by mounting the inventive loader bucket 30 in the bale slicer apparatus 2.

An embodiment 30 of the loader bucket provided by the present invention is illustrated in FIGS. 1-5. The inventive loader bucket 30 is well suited for mounting in a bale slicer apparatus 2 of the type described above and comprises: (i) a longitudinal axis 32; (ii) a floor 34 of the bucket 30 having a lateral scooping edge 36 at the forward longitudinal end of the floor 34; (iii) a left side wall 38 which extends upwardly from a left lateral end of the floor 34; (iv) a right side wall 40 which extends upwardly from a right lateral end of the floor 34; (v) a lateral back wall 42 which extends upwardly, preferably at a forward angle of inclination, from the rearward longitudinal end of the floor 34; (vi) two or more, preferably a pair, of attachment hook structures 44 and 46 which extend rearwardly from the loader bucket 30; and (vii) two or more, preferably three, tine sleeves 48, 50, and 52 which have rearward openings 54 and extend in a forward longitudinal direction on the exterior bottom 56 of the floor 34 of the bucket 30.

The left and right rear attachment hook structures 44 and 46 of the bucket 30 are spaced laterally apart and preferably each have (i) a proximal end 58 which is attached on or above an upper portion of the lateral back wall 42 of the bucket 30, (ii) a downwardly curved hook 60 on the distal end of the rear attachment hook structure 44 or 46, and (iii) an arm 62 which extends rearwardly, at an upward inclination, from the proximal end 58 of the rear attachment hook structure 44 or 46 to the downwardly curved hook 60 on the distal end of the rear attachment hook structure 44 or 46.

In accordance with the bucket mounting method of the present invention as discussed below, the lateral distance from (i) the outer side of the left rear attachment hook structure 44 to (ii) the outer side of the right rear attachment hook structure 46 of the bucket 30 will be less than the internal lateral width of the cutting jaw 6 of the bale slicer 2 from (a) the left outer side arm 10 to (b) the right outer side arm 12 of the cutting jaw 6 so that the rear attachment hook structures 44 and 46 will be received upwardly within the cutting jaw 6 when mounting the bucket 30 in the bale slicer apparatus 2.

By way of example, but not by way of limitation, the left and right rear attachment hook structures 44 and 46 of the loader bucket 30 will each preferably be formed of a pair of parallel plates, but can each alternatively be formed, e.g., of a single plate or other member. In the embodiment 30 of the loader bucket illustrated in the drawings, the proximal ends 58 of the left and right rear attachment hook structures 44 and 46 are secured to and extend from a rectangular frame 64 which is secured on the top of the back wall 42 of the bucket 30.

In order to allow the rear attachment hook structures 44 and 46 to be received in the cutting jaw 6 of the bale slicer 2 when mounting the bucket 30 in the bale slicer 2, downwardly extending openings or open spaces are provided outside of the left and right rear attachment hook structures 44 and 46 of the bucket 30 for receiving the outer side arms 10 and 12 of the cutting jaw 2 of the bale slicer 2. The openings for receiving the left and right outer side arms 10 and 12 of the cutting jaw 2 preferably comprise: (i) an outer left cavity 66 which extends downwardly into a plate 68 (e.g., a gusset support plate) which extends laterally between the left attachment hook structure 44 and the left side wall 38 of the bucket 30 and (ii) an outer right cavity 70 which extends downwardly into a plate 72 (e.g., a gusset support plate) which extends laterally between the right attachment hook structure 46 and the right side wall 40 of the bucket 30.

In order to facilitate the insertion and removal of the tines 8 of the bale slicer 2, each of the tine receiving sleeves 48, 50, and 52 on the exterior bottom 56 of the loader bucket 30 preferably comprises: (a) a pair of opposing side walls 74 and 76 which converge inwardly as the tine sleeve 48, 50, or 52 extends forwardly from the rearward opening 54 of the sleeve and (b) a bottom wall 78 having at least a rearward portion 80 which diverges downwardly away from the exterior bottom 56 of the floor 34 of the bucket 30 as the rearward portion 80 of the bottom wall 78 of the tine sleeve 48, 50, or 52 extends rearwardly to the rearward opening 54 of the sleeve. These features increase the width and depth of the rearward openings 54 of the tine sleeves 48, 50, and 52, and also raise the back of the bucket 30, for easier mating, insertion, and removal of the tines 8 of the bale slicer 2.

More preferably, the bottom wall 78 of each of the tine receiving sleeves 48, 50, and 52 comprises a rearward portion 80 as described above and a forward potion 82 wherein: (i) the rearward portion 80 diverges downwardly away from the exterior bottom 56 of the floor 34 of the bucket 30 at a first angle; (ii) the forward portion 82 diverges downwardly away from the exterior bottom 56 of the floor 34 of the bucket 30 at a second angle as the forward portion 82 of the bottom wall 78 of the tine sleeve 48, 50, or 52 extends rearwardly to the rearward portion 80 of the bottom wall 78 of the tine sleeve 48, 50, or 52; and (iii) the second angle (i.e., the downward angle of the forward portion 82 of the bottom wall 78) is greater than the first angle (i.e., the downward angle of the rearward portion 80 of the bottom wall 78).

The bottom wall 78 of each of the tine receiving sleeves 48, 50, and 52 preferably also has a longitudinal series of spaced apart slots 84 or other openings formed therein so that mud, dirt, and debris will fall out of and will not become compacted within the tine sleeves 48, 50, and 52. In addition, the total number of the tine receiving sleeves 48, 50, and 52 on the bottom of the loader bucket 30 will preferably be less than the number of tines 8 projecting from the bottom of the frame 4 of the bale slicer 2 so that a plurality tines 8 projecting from the bale slicer 2 will be received beneath the bucket 30 between and/or outside of the tine receiving sleeves 48, 50, and 52.

In the method of the present invention for mounting the inventive loader bucket 30 in a bale slicer apparatus 2 of the type described above, the inventive loader bucket 30 is first placed on any convenient ground, pavement, or floor surface. The bale slicer apparatus 2 is then moved by the slicer carrier vehicle 86 into alignment behind the loader bucket 30 and the cutting jaw 6 of the slicer 2 is pivoted to an upward position in which the knife blade 18 of the cutting jaw 6 is at an elevation higher than, and will pass over, the left and right rear attachment hook structures 44 and 46 of the loader bucket 30. The bale slicer 2 is then moved forwardly toward the loader bucket 30 so that the knife blade 18 of the cutting jaw 6 passes over the left and right rear attachment hook structures 44 and 46 of the bucket 30 and one of the tines 8 of the bale slicer apparatus 2 is received in the rearward opening 54 of each one of the tine receiving sleeves 48, 50, and 52 of the loader bucket 30.

Next, the cutting jaw 6 of the bale slicer 2 is pivoted downwardly so that the left and right rear attachment hook structures 44 and 46 are received in the cutting jaw 6 between the left and right outer side arms 10 and 12 of the cutting jaw 6 and between the knife blade 18 and the rearward cross-support 20 of the cutting jaw 6. At the same time, as the cutting jaw 6 of the bale slicer 2 is pivoted downwardly, the left and right outer side arms 10 and 12 of the cutting jaw 6 are received in the above mentioned open spaces or downwardly extending cavities or other openings of the loader bucket 30 which are provided outside of the left and right rear attachment hook structures 44 and 46.

As also noted above, these spaces, cavities, or openings preferably comprise: (i) a left arm receiving cavity 66 which extends downwardly into a left gusset support plate or other plate 68 which extends between the left attachment hook structure 44 the left side wall 38 of the loader bucket 30 and (ii) a right arm receiving cavity 70 which extends downwardly into a right gusset support plate or other plate 72 which extends between the right attachment hook structure 46 the right side wall 40 of the loader bucket 30.

After the cutting jaw 6 of the bale slicer 2 is pivoted downwardly so that the left and right rear attachment hook structures 44 and 46 are received in the cutting jaw 6, the bale slicer apparatus 2 is moved further forward so that the rearward cross-support 20 of the cutting jaw 6 is positioned beneath the downwardly curved hooks 60 on the distal ends of the left and right rear attachment hook structures 44 and 46. Then, the cutting jaw 60 and the rearward cross-support 20 thereof are pivoted upwardly so that the rearward cross-support 20 of the cutting jaw 6 (a) is received in the downwardly curved hooks 60 on the distal ends of the left and right rear attachment hook structures 44 and 46 and thereby (b) holds the loader bucket 30 in the bale slicer apparatus 2.

Consequently, in the inventive loading assembly 85 formed by mounting the inventive loader bucket 30 in the bale slicer apparatus 2, the rearward cross-support 20 of the cutting jaw 6 of the bale slicer 2 is upwardly received in the downwardly curved hooks 60 on the distal ends of the rear attachment hook structures 44 and 46 of the bucket 30 to hold the bucket 30 in the bale slicer apparatus 2.

In order to resume the use of the bale slicer apparatus 2 for lifting, carrying, and opening bales 22 of silage, hay, or other feed materials, the inventive loader bucket 30 can be quickly and easily removed from the bale slicer 2 by: (a) lowering the bucket 30 to the ground and (b) pivoting the cutting jaw 60 and the rearward cross-support 20 thereof downwardly so that the rearward cross-support 20 is removed from the downwardly curved hooks 60 on the distal ends of the left and right rear attachment hook structures 44 and 46 and the left and right outer side arms 10 and 12 of the cutting jaw 6 are again received in the open spaces or downwardly extending cavities 66 and 70 or other openings of the loader bucket 30 which are provided outside of the left and right rear attachment hook structures 44 and 46.

Next, the bale slicer 2 is moved rearwardly a sufficient distance such that the rearward cross-support 20 of the cutting jaw 6 is no longer positioned beneath rear attachment hook structures 44 and 46 of the bucket 30. The cutting jaw 6 of the slicer 2 is then pivoted to the upward position in which the knife blade 18 of the cutting jaw 6 is at an elevation higher than, and will pass over, the left and right rear attachment hook structures 44 and 46 of the loader bucket 30. Finally, the bale slicer 2 is backed rearwardly away from the bucket 30 so that bucket 30 is removed from the curved frame 4 of the slicer apparatus 2 and the tines 8 of the slicer apparatus 2 are withdrawn from the tine receiving sleeves 48, 50, and 52 of the bucket 30.

Thus, the present invention is well adapted to carry out the objectives and attain the ends and advantages mentioned above as well as those inherent therein. While presently preferred embodiments have been described for purposes of this disclosure, numerous changes and modifications will be apparent to those in the art. Such changes and modifications are encompassed within the invention as defined by the claims.

What is claimed is:

1. A bucket mountable in a bale slicer apparatus, the bucket comprising:

a floor having a laterally extending scooping edge at a forward longitudinal end of the floor;

a left side wall extending upwardly from a left lateral end of the floor;

a right side wall extending upwardly from a right lateral end of the floor;

a lateral back wall which extends upwardly from a rearward longitudinal end of the floor;

two or more rear attachment hook structures which are spaced laterally apart, each of the rear attachment hook structures having (i) a proximal end which is attached on or above an upper portion of the lateral back wall, (ii) a downwardly curved hook on a distal end of the rear attachment hook structure, and (iii) an arm which extends rearwardly, at an upward inclination, between the proximal end of the rear attachment hook structure and the downwardly curved hook on the distal end of the rear attachment hook structure;

the two or more rear attachment hook structures being a left hook structure and a right hook structure which is spaced laterally apart from the left hook structure:

a left back plate which extends laterally between the left hook structure and the left side wall, the left back plate having a cavity which extends downwardly into the left back plate for receiving a left outer side arm of a cutting jaw of the bale slicer apparatus; and a right back plate which extends laterally between the right hook structure and the right side wall, the right back plate having a cavity which extends downwardly into the right back plate for receiving a right outer side arm of the cutting jaw of the bale slicer apparatus.

2. The bucket of claim 1 further comprising the lateral back wall inclining forwardly as it extends upwardly.

3. The bucket of claim 1 further comprising two or more tine sleeves which extend longitudinally on an exterior bottom of the floor of the bucket for receiving tines which project forwardly from a bottom of a frame of the bale slicer apparatus, each of the two or more tine sleeves comprising:

a longitudinally rearward opening;

a pair of opposing side walls which converge inwardly as the tine sleeve extends forwardly from the rearward opening; and a bottom wall having at least a rearward portion which diverges downwardly away from the exterior bottom of the floor of the bucket as the rearward portion of the bottom wall of the tine sleeve extends rearwardly to the rearward opening of the tine sleeve.

4. The bucket of claim 3 further comprising for each of the two or more tine sleeves;

the bottom wall of the tine sleeve further comprising a forward portion of the bottom wall of the tine sleeve;

the rearward portion of the bottom wall of the tine sleeve diverging downwardly away from the exterior bottom of the floor of the bucket at a first angle;

the forward portion of the bottom wall of the tine sleeve diverging downwardly away from the exterior bottom of the floor of the bucket at a second angle as the forward portion of the bottom wall of the tine sleeve extends rearwardly to the rearward portion of the bottom wall of the tine sleeve; and the second angle being greater than the first angle.

5. The bucket of claim 3 further comprising, for each of the two or more tine sleeves, a plurality, of slots which are longitudinally spaced apart in the bottom wall of the tine sleeve to allow dirt and debris to fall out of the tine sleeve.

6. A loading assembly comprising:

a bale slicer apparatus comprising a curved frame having a concave forward face, a cutting jaw, and a plurality of tines which project forwardly from a bottom of the curved frame;

the cutting jaw comprising an opposing pair of outer side arms which (i) have distal ends and (ii) have rearward ends which are pivotably connected to the curved frame, a knife blade which extends transversely between the distal ends of the outer side arms, and a rearward cross-support which extends transversely between the outer side arms and moves in an arc within the forward face of the curved frame when the cutting jaw is pivoted upwardly and downwardly with respect to the curved frame;

a bucket mounted in the bale slicer apparatus, the bucket having a floor, a back wall which extends upwardly from the floor, a pair of rear attachment hook structures which are laterally spaced apart, and two or more tine sleeves which extend longitudinally on an exterior bottom of the floor of the bucket and in which a corresponding number of the tines of the bale slicer apparatus are received;

each of the rear attachment hook structures of the bucket comprising (i) a proximal end which is attached on or above an upper portion of the back wall of the bucket, (ii) a downwardly curved hook on a distal end of the rear attachment hook structure, and (iii) an arm which extends rearwardly, at an upward inclination, between the proximal end of the rear attachment hook structure and the downwardly curved hook on the distal end of the rear attachment hook structure; and the rearward cross-support of the cutting jaw being upwardly received in the downwardly curved hooks on the distal ends of the rear attachment hook structures of the bucket to hold the bucket in the bale slicer apparatus.

7. The loading assembly of claim 6 further comprising the rearward cross-support of the cutting jaw being cylindrical.

8. The loading assembly of claim 6 further comprising a total number of the tines projecting forwardly from the bottom of the curved frame being greater than a total number of the tine sleeves on the exterior bottom of the floor of the bucket.

9. The loading assembly of claim 6 further comprising the back wall of the bucket inclining forwardly as it extends upwardly.

10. The loading assembly of claim 6 further comprising each of the tine sleeves having:

a longitudinally rearward opening;

a pair of opposing side walls which converge inwardly as the tine sleeve extends forwardly from the rearward opening; and a bottom wall having at least a rearward portion which diverges downwardly away from the exterior bottom of the floor of the bucket as the rearward portion of the bottom wall of the tine sleeve extends rearwardly to the rearward opening of the tine sleeve.

* * * * *